(12) United States Patent
Kumar

(10) Patent No.: US 10,749,783 B2
(45) Date of Patent: Aug. 18, 2020

(54) TEST DEVICE AND TEST METHOD

(71) Applicant: Rohde & Schwarz GmbH & Co. KG, München (DE)

(72) Inventor: Nikhil Kumar, Fremont, CA (US)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 290 days.

(21) Appl. No.: 15/418,301

(22) Filed: Jan. 27, 2017

(65) Prior Publication Data

US 2018/0219761 A1 Aug. 2, 2018

(51) Int. Cl.
*H04L 12/26* (2006.01)
*H04B 17/17* (2015.01)
*G06F 11/273* (2006.01)
*H04L 29/06* (2006.01)

(52) U.S. Cl.
CPC .......... *H04L 43/18* (2013.01); *G06F 11/273* (2013.01); *H04B 17/17* (2015.01); *H04L 43/50* (2013.01); *H04L 67/42* (2013.01)

(58) Field of Classification Search
CPC ......... H04L 43/18; H04L 43/50; H04L 67/42; H04B 17/17; G06F 11/277
USPC ...................................................... 709/224
See application file for complete search history.

(56) References Cited

U.S. PATENT DOCUMENTS

| | | | |
|---|---|---|---|
| 5,850,388 A | 12/1998 | Anderson et al. | |
| 6,931,574 B1* | 8/2005 | Coupal | H04L 43/18 709/230 |
| 7,562,156 B2* | 7/2009 | Phadke | H04L 43/00 709/230 |
| 7,876,777 B2* | 1/2011 | Hrishikesh | H04L 63/0428 370/465 |
| 9,069,037 B2* | 6/2015 | Yu | G01R 31/2822 |
| 9,883,412 B2* | 1/2018 | Chandra | H04L 69/02 |

(Continued)

FOREIGN PATENT DOCUMENTS

| | | | |
|---|---|---|---|
| JP | H08-65362 | 3/1996 | |
| WO | WO 2012/026881 A1 | 3/2012 | |
| WO | WO-2012026881 A1 * | 3/2012 | ............ G06F 11/263 |

OTHER PUBLICATIONS

Communication of the extended European search report for European Patent Application No. 17156701.9 (dated Jul. 25, 2017).

*Primary Examiner* — Vivek Srivastava
*Assistant Examiner* — Binod J Kunwar
(74) *Attorney, Agent, or Firm* — Shumaker & Sieffert, P.A.

(57) ABSTRACT

The present invention provides a test device for analyzing data communication of an electronic device, the test device comprising a data encoder configured to encode outgoing data according to a predefined physical protocol and output a respective outgoing physical signal to the electronic device, a data analyzer configured to receive an incoming physical signal from the electronic device and provide incoming data encoded in the incoming physical signal, a protocol emulator that is coupled to the data encoder and the data analyzer and that is configured to generate the outgoing data and decode the incoming data according to a predetermined application protocol, and a protocol analyzer that is coupled to the protocol emulator and that is configured to analyze a protocol conformance of the incoming data to the predefined application protocol. Further, the present invention provides a respective test method.

14 Claims, 4 Drawing Sheets

(56) References Cited

U.S. PATENT DOCUMENTS

| | | | |
|---|---|---|---|
| 9,917,665 B1* | 3/2018 | Schmidt | H04B 17/336 |
| 9,941,983 B1* | 4/2018 | Seebacher | H04B 17/0085 |
| 10,069,587 B1* | 9/2018 | Rimini | H04J 11/0023 |
| 2006/0264178 A1 | 11/2006 | Noble et al. | |
| 2010/0319071 A1* | 12/2010 | Ganacharya | G06F 21/564 |
| | | | 726/24 |
| 2013/0114625 A1* | 5/2013 | Cunningham | H04L 41/5009 |
| | | | 370/469 |
| 2013/0122842 A1* | 5/2013 | Elfstrom | H04B 17/21 |
| | | | 455/226.3 |
| 2013/0265444 A1* | 10/2013 | Walsh | H04B 10/073 |
| | | | 348/192 |
| 2013/0275811 A1* | 10/2013 | Wong | G06F 11/079 |
| | | | 714/37 |
| 2014/0032637 A1* | 1/2014 | Weir | G01R 31/2834 |
| | | | 709/203 |
| 2014/0078973 A1* | 3/2014 | Kazmi | H04W 8/22 |
| | | | 370/329 |
| 2014/0254647 A1* | 9/2014 | Stott | H04L 43/50 |
| | | | 375/224 |
| 2014/0321285 A1* | 10/2014 | Chew | H04L 47/24 |
| | | | 370/236 |
| 2015/0365837 A1* | 12/2015 | Valasma | H04W 24/08 |
| | | | 455/418 |
| 2017/0339589 A1* | 11/2017 | Reijonen | H04W 24/10 |

* cited by examiner

TEST DEVICE AND TEST METHOD

TECHNICAL FIELD

The present invention relates to a test device for analyzing data communication of an electronic device. The present invention further relates to a respective test method.

TECHNICAL BACKGROUND

Although applicable in principle to any system that measures data in electronic devices, the present invention and its underlying problem will be hereinafter described in combination with Internet-of-Things (IoT) devices.

Networked or communicated electronic devices are used in an increasing number of applications. A plurality of these electronic devices use wireless data communication mechanisms to receive or transmit data. Such data can e.g. comprise sensor data that is sensed by the device and is transmitted to a central server. The data can also comprise control commands that are provided from a server to an electronic device, like e.g. an actor with a motor or the like.

Electronic devices that communicate via wireless or wired data networks must conform to legal regulations and standard requirements. To ensure the conformance of the electronic devices with all requirements the manufacturers of the electronic devices must thoroughly test the devices e.g. during development or production of the electronic devices. The testing of networked electronic devices is a complex and time-consuming task.

Against this background, there is the need for a simplified testing of electronic devices.

SUMMARY OF THE INVENTION

According to aspects of the invention, it is provided:

A test device for analyzing data communication of an electronic device, the test device comprising a data encoder configured to encode outgoing data, i.e. data that has to be transmitted to the electronic device, according to a predefined physical protocol and output a respective outgoing physical signal to the electronic device, a data analyzer configured to receive an incoming physical signal from the electronic device and provide incoming data encoded in the incoming physical signal, i.e. data that is received from the electronic device, a protocol emulator that is coupled to the data encoder and the data analyzer and that is configured to generate the outgoing data and decode the incoming data according to a predetermined application protocol, and a protocol analyzer that is coupled to the protocol emulator and that is configured to analyze a protocol conformance of the incoming data to the predefined application protocol.

A test method for analyzing data communication of an electronic device, the test method comprising generating outgoing data according to a predetermined application protocol, and encoding the outgoing data according to a predefined physical protocol into a respective outgoing physical signal, outputting the outgoing physical signal to the electronic device, receiving an incoming physical signal from the electronic device, providing incoming data encoded in the incoming physical signal, decoding the incoming data according to a predetermined application protocol, and analyzing a protocol conformance of the incoming data to the predefined application protocol.

Modern electronic devices usually transmit application data via a predefined physical or low-level protocol. The term physical or low-level protocol refers to the underlying network technology that is used to transmit the application data. The application protocol can be any type of application protocol that may be used by the electronic device to receive or transmit application data, like e.g. measured sensor data or control commands.

The present invention is based on the finding that the underlying physical protocol may have important impact on the data communication in the application layer, i.e. the data communication via the application protocol.

For example changing circumstances in the physical layer, like e.g. changing Signal to Noise ratios, SNRs, signal interferences or the like, may lead to retransmissions of data frames or loss of data frames. Retransmission may lead to a delay in the delivery or loss of data packets of the application protocol. Depending on the application protocol such a delay or loss of data packets must be handled accordingly.

The present invention therefore provides an integrated device that allows generating and receiving the physical layer data signals as well as generating, receiving and analyzing the application protocol data.

This arrangement of the present invention allows analyzing the behavior of the electronic device under test, DUT, in-depth while for example modifying the signal transmission in the physical layer e.g. by injecting errors or interferences in the physical layer.

At the same time any influence of this modified signal transmission in the physical layer on the application layer can be monitored and analyzed with the help of the protocol analyzer.

The present invention therefore allows e.g. monitoring cross-influences from the physical layer into the application layer. It is understood that the influences from the application layer to the physical layer can also be analyzed e.g. by modifying the data transmission with the protocol emulator.

Possible physical protocols can e.g. comprise wired Ethernet networks, wireless WIFI networks, BLUETOOTH networks or communications, GSM, UMTS, LTE, NB-Iot, 6LoWPAN or other wireless cellular networks or any other type of networking protocols that do not provide application specific functions. In this context the communication layers that are not exactly a physical or PHY layer and are not provided by the application layer, e.g. the TCP layer, the IP layer or the UDP layer can be seen as part of the physical protocol.

In contrast to the physical protocol the present invention also contemplates the application layer or application protocol. Such protocols can e.g. comprise HTML based protocols like e.g. COAP, REST, JavaScript based asynchronous communication or other protocols, like e.g. MQTT. Such protocols are especially useful with low performance devices, like e.g. used in IoT applications. Other application protocols may include proprietary protocols or any text based or binary based application protocol. In fact, any protocol that makes use or is stacked on top of the physical protocol can be seen as an application protocol regarding the present invention.

Further embodiments and aspects are subject of the further subclaims and of the following description, referring to the drawings.

In a possible embodiment, the data encoder can comprise a physical layer transformer that is configured to transform the outgoing data into the outgoing physical signal. Further, the data encoder can comprise a signal modifier that is configured to modify the outgoing data or the outgoing physical signal according to predefined modification parameters. The physical layer transformer can comprise any kind of transmitter, e.g. an RF interface, and a protocol engine that allows purposefully injecting modifications or errors in the outgoing physical signal with the help of the signal modifier. The modification parameters allow explicitly setting the type of modification or error that should be injected into the outgoing signal.

The physical layer transformer therefore allows e.g. outputting a physical signal that emulates a cellular network base station, like e.g. a LTE EnodeB, a WIFI access point, a GSM base station, a Bluetooth pairing partner or the like, but with deviations of the respective physical protocol or errors in the outgoing physical signal.

The reactions of the electronic device under test in view of the such modified outgoing physical signal can then be monitored on the physical layer with the data analyzer as well as in the application layer with the protocol analyzer.

The injected modifications or errors may e.g. cause re-transmission of signal frames or data packets or may cause the initiation of error correction mechanisms or signal re-routing or bundling of messages in the electronic device under test. This in consequence may have impact on the application layer, where e.g. timeouts may be reached or the like. The application layer may then also perform a re-transmission or error correction.

The present invention allows monitoring all the reactions of the physical protocol or layer as well as the application layer or protocol and detect any interference or influence between the layers that may exist. Therefore, thorough testing of the electronic device under test is possible.

In a possible embodiment, at least one modification parameter can refer to modifications of physical parameters of the outgoing physical signal. The physical parameters of the outgoing physical signal can e.g. be any specific parameter of the waveform of the outgoing physical signal. The modification parameters can e.g. refer to an attenuation factor, a signal-to-noise ratio, a fading factor or the like. This means that a modification parameter can e.g. instruct the signal modifier to increase the signal to noise ratio of the outgoing physical signal, to fade the outgoing physical signal, to distort or otherwise modify the outgoing physical signal.

The generation of the outgoing physical signal may comprise the generation of MIMO signal groups with multiple signals. In such a case the parameters may refer to the modification of single ones or all of the MIMO signals.

In a possible embodiment, at least one modification parameter may refer to a modification of a section of the outgoing physical signal that is provided by the physical protocol.

Sections of the outgoing physical signal that are provided by the physical protocol in this context refer to the content transported with a waveform not the waveform itself. Such content can e.g. comprise the data from the application protocol or layer and added features, like e.g. headers, error correction sections, like CRCs, trailing sequences or the like.

In a possible embodiment, the test device may comprise an interference generator, configured to generate an interference physical signal according to a predefined interference physical protocol. The interference generator can e.g. be used to emulate or simulate the presence or co-existence of a second type of network, e.g. of the same physical protocol as the outgoing physical signal or another physical protocol. Such a co-existence can e.g. refer to two WiFi cells, Bluetooth cells, GSM cells, two LTE cells, Narrow-Band-IoT (LTE NB-IoT) cells e.g. according to 3GPP Release 13, 6LoWPAN, or the like. Further, any type of cells can be combined.

In a possible embodiment, the protocol emulator can be configured to generate the outgoing data as a client or a server or a broker for the application protocol. The protocol emulator can e.g. comprise a respective program or state machine or an FPGA or the like, that emulates a client, server, broker or any other entity for the respective application protocol. The protocol emulator therefore allows testing all the different entities of a respective network by providing their respective communication counterparts.

For example, the application protocol may be MQTT and the physical protocol may be TCP/IP over WiFi. In this case, the protocol emulator can emulate a MQTT broker that can e.g. receive Application Messages from or transmit them to the electronic device under test. The protocol emulator can also emulate a number, e.g. one or more, of other clients alone or in combination with the emulation of the broker. The same principle applies to any other application protocol, i.e. the protocol emulator can emulate any number of entities according to the respective application protocol.

In a possible embodiment, the data encoder can be configured to generate the outgoing physical signal as a client or a server or a broker for the physical protocol. A client in this context can e.g. be any entity that may be used to transmit data into or retrieve data from the respective network. The clients may provide application functions. Exemplary clients can e.g. be IoT-Devices like sensors or actors, Bluetooth-beacons, WIFI clients or the like. A server in this context can be any entity that allows the clients to access the respective network. A server can for example be a GSM, UMTS or LTE base station, a WIFI access point, a Bluetooth or NB-IoT communication platform or the like. The data encoder may e.g. comprise a network simulator or core network simulator to provide the necessary functionality.

Where appropriate, the above-mentioned configurations and developments can be combined in any manner. Further possible configurations, developments and implementations of the invention also include combinations, which are not explicitly mentioned, of features of the invention which have been described previously or are described in the following with reference to the embodiments. In particular, in this case, a person skilled in the art will also add individual aspects as improvements or supplements to the basic form of the present invention.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
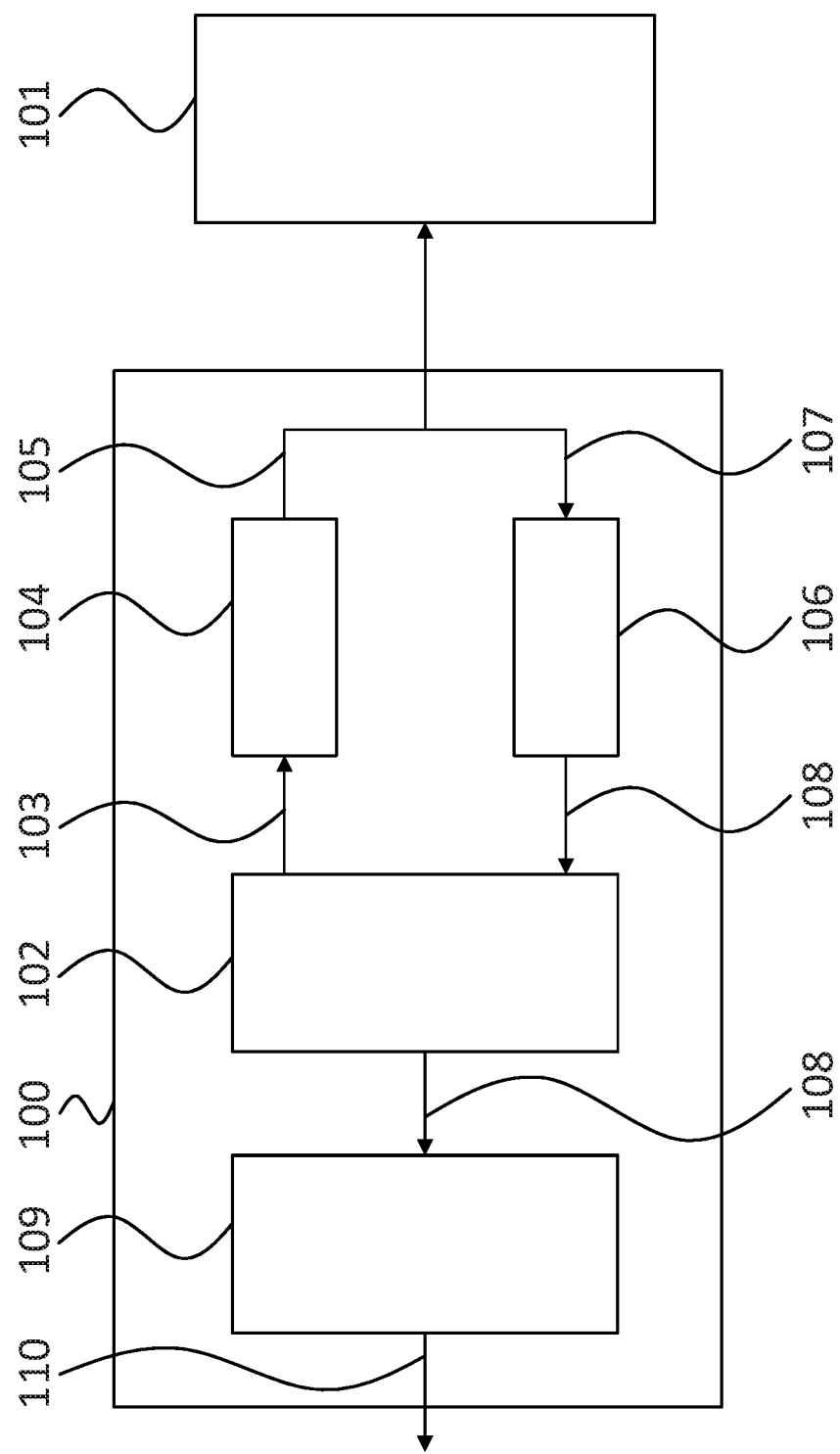
FIG. 1 shows a block diagram of an embodiment of a test device according to the present invention.

The appended drawings are intended to provide further under-standing of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated other-wise.

DETAILED DESCRIPTION OF THE EMBODIMENTS

FIG. 1 shows a block diagram of a test device 100 for analyzing data communication of an electronic device 101. Although a direct connection line is shown between the test device 100 and the electronic device 101 in FIG. 1, the test device 100 can be coupled to the electronic device 101 via any communication method, wired or wireless. The details of the electronic device 101 are not shown for sake of clarity. However, it is understood that the electronic device 101 can comprise an combination of hardware and software that allows the electronic device 101 to communicate data according to a predetermined physical protocol and a predetermined application protocol.

The test device 100 comprises a protocol emulator 102 that is coupled to a data encoder 104 and a data analyzer 106. Both the data encoder 104 and the data analyzer 106 are coupled to the electronic device 101. Further, the protocol emulator 102 is coupled to a protocol analyzer 109.

The protocol emulator 102 generates outgoing data 103 and provides the outgoing data 103 to the data encoder 104. The outgoing data 103 can be data conforming to any application protocol that must be evaluated with the electronic device 101. Such a protocol can e.g. be a HTTP, COAP, MQTT, IFTTT or any other protocol, especially an IoT protocol. The application protocol can also comprise further protocols or application data that is transmitted e.g. via HTTP. Such application data can e.g. be generated by HTML and JavaScript based devices. The protocol emulator 102 can e.g. generate the outgoing data 103 as a client or a server or a broker (if it exists) for the respective application protocol.

The protocol emulator 102 provides the outgoing data 103 to the data encoder 104. The data encoder 104 then encodes the outgoing data 103 according to a predefined physical protocol. The physical protocol can e.g. be a wired physical protocol, like e.g. Ethernet, or any wireless physical protocol, like e.g. WIFI, Bluetooth, GSM, UMTS, LTE, 6LoW-PAN, ZigBee or the like.

The data encoder 104 will then generate and output a respective outgoing physical signal 105 to the electronic device 101. The data encoder 104 can e.g. generate the outgoing physical signal 105 as a client or a server or a broker (if it exits) for the physical protocol.

The response of the electronic device 101 will then be received by the data analyzer 106 in the form of an incoming physical signal 107. The data analyzer 106 analyzes the incoming physical signal 107 and provides the incoming data 108 encoded in the incoming physical signal 107 to the protocol emulator 102. Further, the data analyzer 106 can perform any kind of conformance tests regarding the physical protocol on the incoming physical signal 106.

The protocol emulator 102 on the one hand will use the incoming data 108 to continue the communication with the electronic device 101. On the other hand the protocol emulator 102 will forward the incoming data 108 to the protocol analyzer 109.

The protocol analyzer 109 will then analyze a protocol conformance of the incoming data 108 to the predefined application protocol and provide a respective conformance result 110. The conformance result 110 can e.g. be a binary value that indicates a conformance or compliance of the electronic device 101 with the application protocol or a deviation of the electronic device 101 of the regulations of the application protocol. However, it is understood that the conformance result 110 can also comprise more details, e.g. about the violations of the application protocol by the electronic device 101. Such details may e.g. comprise information about wrong data sequences, error correction data, packet formats, counter sequences, or any other wrong or misshaped information in the incoming data 108.

Figure 2:
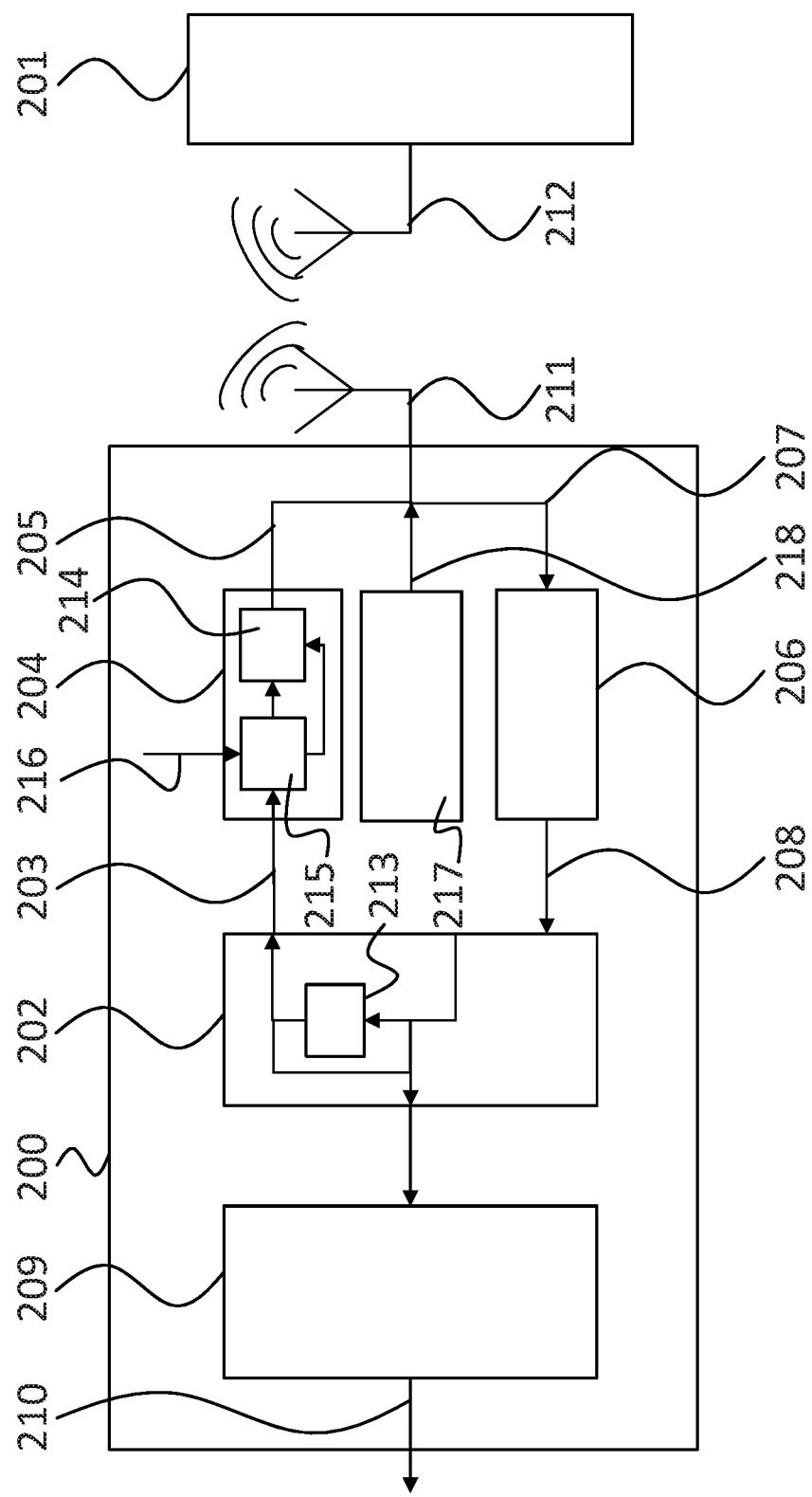
FIG. 2 shows a block diagram of another embodiment of a test device according to the present invention.

FIG. 2 shows a block diagram of another test device 200. The test device 200 is based on the test device 100 of FIG. 1 and comprises further elements. In addition, the test device 200 and the electronic device 201 are coupled via a wireless connection via antennas 211, 212.

The protocol emulator 202 comprises a protocol engine 213 that generates the outgoing data 203 according to the respective application protocol. The protocol engine 213 can e.g. comprise a state machine or any other program or combination of hardware or software that support the communication according to the respective application protocol.

The data encoder 204 comprises a signal modifier 215 that modifies the outgoing data 203 and/or the outgoing physical signal 205 according to specific modification parameters 216. The signal modifier 215 can e.g. work directly on the outgoing data 203 or provide instructions to a physical layer transformer 214 that generates the outgoing physical signal 205 based on the outgoing data 203.

The modification parameters 216 can e.g. refer to modifications of physical parameters of the outgoing physical signal 205, like the signal-to-noise ratio, SNR, the power level, fading, frequency drifts or the like. Further, the modification parameters 216 can refer to a modification of data I a section of the outgoing physical signal 205 that is provided by the physical protocol. Such sections can e.g. refer to CRC bits, trailing or following information or the like. The signal modifier 215 can act directly on the outgoing data 203 or the outgoing physical signal 205. Alternatively or in addition the signal modifier 215 can instruct the physical layer transformer 216 to modify the outgoing physical signal 205 accordingly.

The test device 200 further comprises an interference generator 217. The interference generator 217 serves to generate signals, the mimic further communication devices, either of the same network as the electronic device 201 or of another network. The interference generator 217 generates a interference physical signal 218 that comprises the waveform that would be generated by the further communication devices. The interference generator 217 can as well as the data encoder 204 generate the interference physical signal 218 as a server, access point or base station of the respective physical protocol or as client, e.g. user equipment, IoT-device or the like. The interference generated 217 in FIG. 2 uses the same antenna 211 as the data encoder 204. Is it however understood that the interference generator 217 can also use another antenna.

Figure 3:
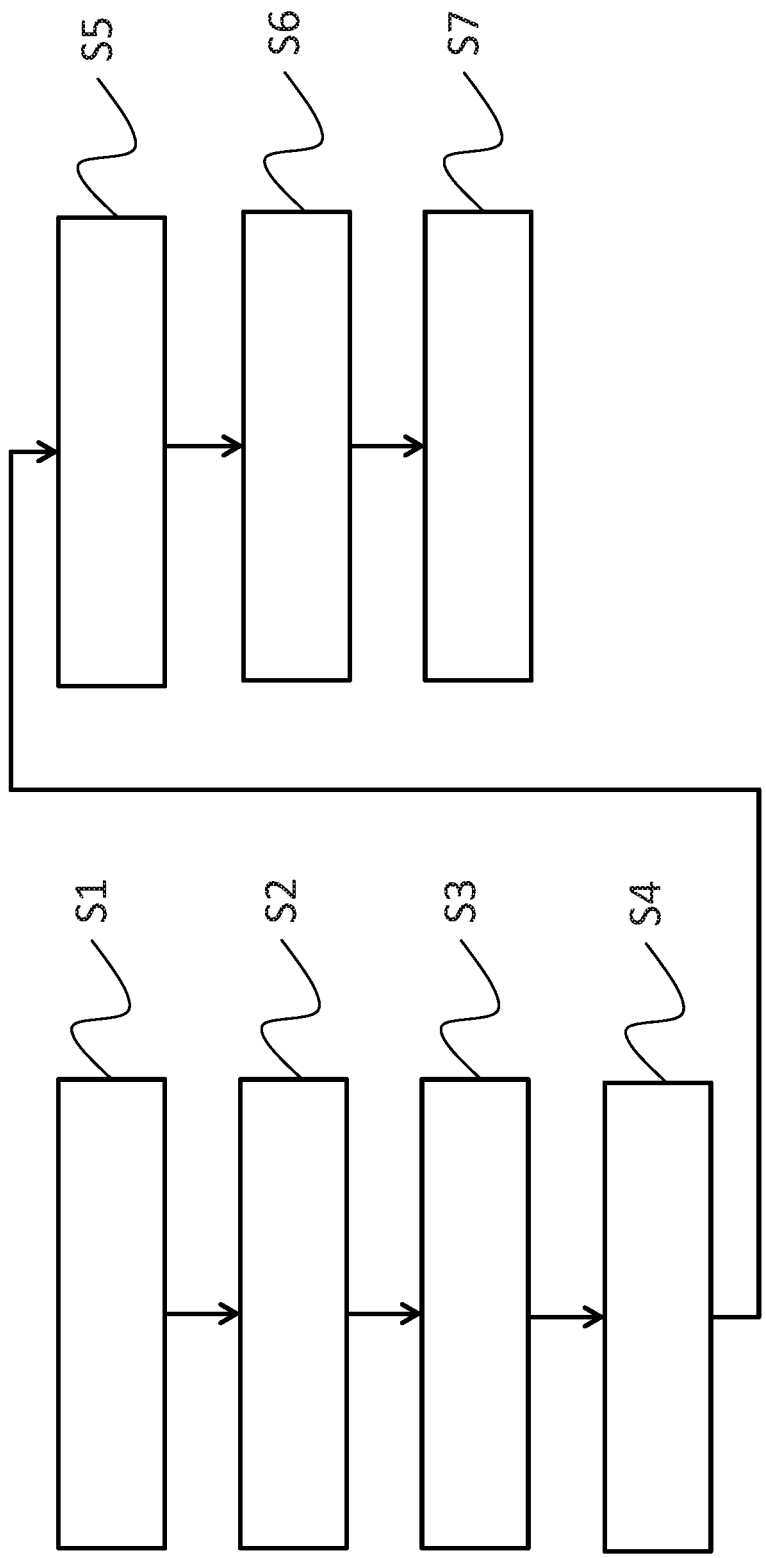
FIG. 3 shows a flow diagram of an embodiment of a method according to the present invention.

FIG. 3 shows a flow diagram of an embodiment of a test method for analyzing data communication of an electronic device 101, 201. For ease of understanding the reference signs used in the description of device based FIGS. 1 and 2 will also be used to describe the method in FIGS. 3 and 4.

The test method comprises generating S1 outgoing data 103, 203 according to a predetermined application protocol, and encoding S2 the outgoing data 103, 203 according to a predefined physical protocol into a respective outgoing physical signal 105, 205. Possible physical protocols can e.g. comprise wired Ethernet networks, wireless WIFI networks, Bluetooth networks or communications, GSM, UMTS, LTE, NB-Iot, 6LoWPAN or other wireless cellular networks or any other type of networking protocols that do not provide application specific functions. Possible application protocols can comprise HTML based protocols like e.g. COAP, REST, JavaScript based asynchronous communication or other protocols, like e.g. MQTT. The outgoing data 103, 203 can e.g. be generated as data from a client or a server or a broker for the application protocol. Further, the outgoing data 103, 203 can be encoded generating the outgoing physical signal 105, 205 as signal from a client or a server or a broker for the physical protocol. Just as an example, a MQTT Broker could be implemented on a WIFI client. There is no need to provide application layer servers or brokers on physical layer servers or brokers.

The method further comprises outputting S3 the outgoing physical signal 105, 205 to the electronic device 101, 201, and receiving S4 an incoming physical signal 107, 207 from the electronic device 101, 201. The incoming physical signal 107, 207 can then be analyzed and the incoming data 108, 208 encoded in the incoming physical signal 107, 207 can be extracted. The step of analyzing may also comprise testing the physical layer conformance of the incoming physical signal 107, 207. The incoming data 108, 208 can then be decoded S6 according to a predetermined application protocol.

Finally, the protocol conformance of the incoming data 108, 208 to the predefined application protocol can be analyzed S7.

Figure 4:
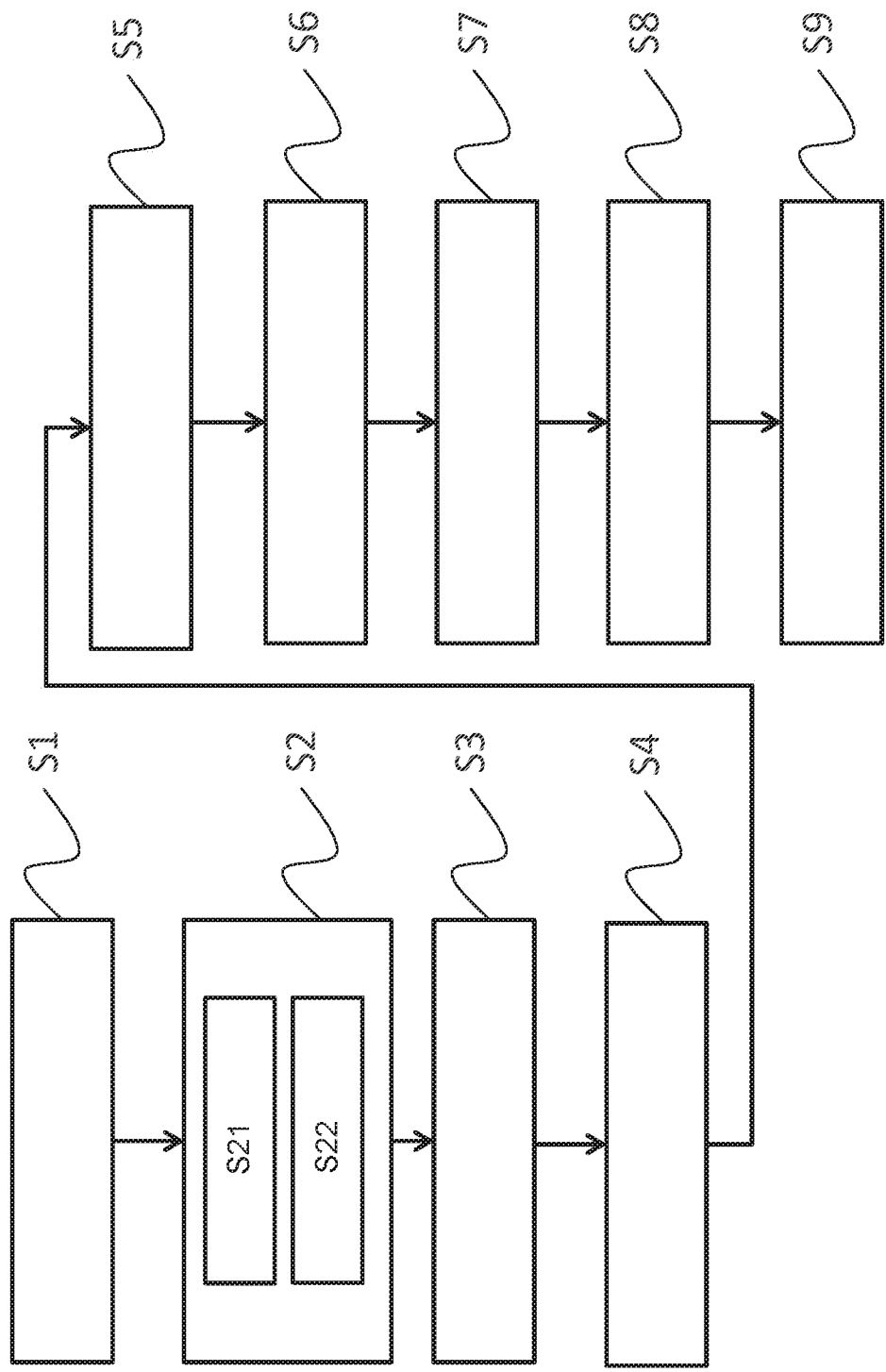
FIG. 4 shows a flow diagram of another embodiment of a method according to the present invention.

FIG. 4 shows a flow diagram of another embodiment of a test method according to the present invention.

In the flow diagram of FIG. 4 encoding S2 comprises transforming S21 the outgoing data 103, 203 into the outgoing physical signal 105, 205 and modifying S22 the outgoing data 103, 203 or the outgoing physical signal 105, 205 according to predefined modification parameters 216.

The modification parameters 216 can e.g. refer to modifications of physical parameters of the outgoing physical signal 105, 205, like the signal-to-noise ratio, SNR, the power level, fading, frequency drifts or the like. Further, the modification parameters 216 can refer to a modification of a section of the outgoing physical signal 105, 205 that is provided by the physical protocol. Such sections can e.g. refer to CRC bits, trailing or following information or the like.

Finally, the method comprises generating S8 and emitting S9 an interference physical signal 218 according to a predefined interference physical protocol. It is understood, that the generating S8 and emitting S9 an interference physical signal 218 although discussed at the end of the method, can be performed throughout the entire measurement.

It is understood, that at least some of the elements or method steps of the present invention can be provided as software, hardware or a combination of software and hardware. Possible hardware e.g. comprises general purpose processors, ASICs, FPGAs, CPLDs or the like. Especially the protocol emulator can e.g. be provided as a software component that is executed by a respective processor or as a programmed FPGA. This allows easily modifying the protocol emulator to change the application protocol. The same applies to the data encoder and the data decoder. Further, for example the data encoder, the data analyzer, and the physical layer transformer and the data decoder may comprise RF circuits for transmitting or receiving signals.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF USED REFERENCE SIGNS 100, 200 test device
101, 201 electronic device
102, 202 protocol emulator
103, 203 outgoing data
104, 204 data encoder
105, 205 outgoing physical signal
106, 206 data analyzer
107, 207 incoming physical signal
108, 208 incoming data
109, 209 protocol analyzer
110, 210 conformance result
211, 212 antenna
213 protocol engine
214 physical layer transformer
215 signal modifier
216 modification parameter
217 interference generator
218 interference physical signal
S1-S9 method steps
S21, S22 method steps

The invention claimed is:

1. A test device for analyzing data communication of an electronic device under test (DUT), wherein the electronic DUT is separate from the test device;
wherein the test device is configured to send an outgoing physical signal to the electronic DUT,
wherein the outgoing physical signal is configured to cause the electronic DUT to output a response signal,
wherein the test device is configured to receive the response signal as an incoming physical signal and analyze the behavior of the electronic DUT based on the incoming physical signal,
the test device comprising:
a) a data encoder configured to:
receive outgoing data,
encode the outgoing data according to a predefined physical protocol, wherein the predefined physical protocol comprises wired Ethernet networks, wireless WiFi networks, BLUETOOTH, GSM, UMTS, LTE, NB-Iot, and 6LoWPAN, and
output outgoing physical signal with the encoded outgoing data on the physical layer to the electronic DUT,
b) a data analyzer configured to:
receive the incoming physical signal on the physical layer from the electronic DUT;
analyze the incoming physical signal on the physical layer for conformance to the predefined physical protocol; and
output the incoming data from the incoming physical signal,
c) a protocol emulator that is coupled to the data encoder and the data analyzer and that is configured to:
generate the outgoing data based on an application layer of a predefined application protocol, wherein the predefined application protocol comprises HTML protocols, COAP, REST, JavaScript protocols, asynchronous communication protocols and MQ Telemetry Transport (MQTT),
provide the outgoing data to the data encoder; and
receive the incoming data from the data analyzer; and
d) a protocol analyzer that is coupled to the protocol emulator and that is configured to:
analyze the incoming data for protocol conformance to the predefined application protocol; and
e) wherein the data encoder comprises:
e1) a physical layer transformer that is configured to transform the outgoing data into the outgoing physical signal on the physical layer, and
e2) a signal modifier that is configured to modify the outgoing data and the outgoing physical signal on the physical layer according to predefined modification parameters, to cause the physical layer transformer
e3) to output the physical signal on the physical layer to the electronic DUT with modifications including: deviations of the respective physical protocol and errors in the outgoing physical signal,
f1) wherein the modification parameters include an attenuation parameter, SNR factor, fading factor, power level, frequency drift, and a modification of data in a section of the outgoing physical signal on the physical layer, wherein the section of the outgoing signal refers to one or more of: CRC bits, trailing bits and outgoing data, and the modification parameter instructs the signal modifier to:
increase the signal to noise ratio of the outgoing physical signal on the physical layer,
to fade the outgoing physical signal on the physical layer, and
to distort the outgoing physical signal on the physical layer;
f2) wherein the physical layer transformer comprises an RF interface; and
f3) wherein the modifications are such as to cause any of retransmissions of signal frames, retransmission of data packets, cause an initiation of an error correction mechanism, cause signal re-routing and bundling of messages in the electronic device under test.

2. The device of claim 1, further comprising:
an interference generator configured to generate an interference physical signal according to a predefined interference physical protocol.

3. The device of claim 1, wherein the protocol emulator is further configured to generate the outgoing data as any of a client, a server, and a broker for the application protocol.

4. The device of claim 1, wherein the data encoder is configured to generate the outgoing physical signal as any of a client, a server, and a broker for the physical protocol.

5. A test method for analyzing data communication of an electronic device under test (DUT), the test method comprising:
a) generating outgoing data according to a predefined application protocol,
b) encoding the outgoing data according to a predefined physical protocol into a outgoing physical signal on the physical layer,
c) outputting the outgoing physical signal on the physical layer to the electronic DUT,
d) receiving an incoming physical signal on the physical layer from the electronic DUT,
e) analyzing a protocol conformance of the received incoming physical signal from the physical layer to a predefined physical protocol, and outputting incoming data encoded from the incoming physical signal, wherein the predefined physical protocol comprises wired Ethernet networks, wireless WiFi networks, BLUETOOTH, GSM, UMTS, LTE, NB-Iot, and 6LoWPAN,
f) decoding the incoming data according to the predefined application protocol, and
g) analyzing a protocol conformance of the incoming data from the physical layer to the predefined application protocol, wherein the predefined application protocol comprises HTML protocols, COAP, REST, JavaScript protocols, asynchronous communication protocols and MQ Telemetry Transport (MQTT);
h) wherein encoding the outgoing data further comprises:
h1) transforming, by a physical layer transformer, the outgoing data into the respective outgoing physical signal on the physical layer; and
h2) modifying, by a signal modifier, the outgoing physical signal on the physical layer according to predefined modification parameters,
h3) outputting, by the physical layer transformer, the physical signal with modifications including deviations of the respective physical protocol in the outgoing physical signal on the physical layer,
i1) wherein the modification parameters include an attenuation parameter, SNR factor, fading factor, power level, frequency drift, and a modification of data in a section of the outgoing physical signal on the physical layer, wherein the section of the outgoing signal refers to CRC bits, trailing bits, and outgoing data, and the modification parameter instructs the signal modifier to:

increase the signal to noise ratio of the outgoing physical signal on the physical layer,
to fade the outgoing physical signal on the physical layer, or
to distort the outgoing physical signal on the physical layer;

i2) wherein the physical layer transformer comprises an RF interface; and i3) wherein the modifications are such as to cause any of retransmissions of signal frames, retransmissions of data packets, cause an initiation of an error correction mechanism, cause signal re-routing and cause bundling of messages in the electronic device under test.

6. The method of claim 5, further comprising:
generating and emitting an interference physical signal according to a predefined interference physical protocol.

7. The method of claim 5, wherein generating outgoing data further comprises:
generating the outgoing data as a client or generating the outgoing data as a server or generating the outgoing data as a broker for the application protocol.

8. The method of claim 5, wherein encoding the outgoing data further comprises:
generating the outgoing physical signal as a client or generating the outgoing physical signal as a server or generating the outgoing physical signal as a broker for the physical protocol.

9. The device of claim 3, wherein the protocol emulator is configured to emulate an MQTT broker.

10. The device of claim 3, wherein the protocol emulator is configured to emulate the client alone and a combination of the client with the emulation of the broker for the application protocol.

11. The device of claim 4, wherein the data encoder is configured to generate the outgoing physical signal as an IoT sensors, an IoT actor, a Bluetooth-beacons, and a WiFi client.

12. The device of claim 4, wherein the data encoder is configured to generate the outgoing physical signal as a GSM base station, a UMTS base station, a LTE base station, a WIFI access point, a Bluetooth communication platform and a NB-IoT communication platform.

13. The device of claim 1, wherein the data encoder comprises a network simulator.

14. The method of claim 5, wherein modifying the outgoing physical signal further comprises modifying the outgoing data encoded into the outgoing physical signal.

* * * * *